United States Patent
Gadkaree

[11] Patent Number: 6,129,846
[45] Date of Patent: Oct. 10, 2000

[54] ACTIVATED CARBON COMPOSITE WITH CRYSTALLINE TIN SILICATE

[75] Inventor: Kishor P. Gadkaree, Big Flats, N.Y.

[73] Assignee: Corning Incorporated, Corning, N.Y.

[21] Appl. No.: 09/184,608

[22] Filed: Nov. 2, 1998

Related U.S. Application Data

[60] Provisional application No. 60/066,001, Nov. 14, 1997.

[51] Int. Cl.⁷ .................................................... B01D 15/04
[52] U.S. Cl. .......................... 210/679; 210/688; 210/683; 210/694; 210/502.1; 210/510.1; 210/912; 502/182; 502/242; 423/460
[58] Field of Search ...................................... 210/679, 681, 210/683, 688, 694, 502.1, 506, 908, 510.1, 911, 912; 502/182, 242, 349, 350, 352, 407; 428/408, 446, 701, 702; 423/445–447, 460; 264/29.1

[56] References Cited

U.S. PATENT DOCUMENTS

| | | |
|---|---|---|
| 3,720,626 | 3/1973 | Benzaria et al. . |
| 3,885,977 | 5/1975 | Lachman et al. . |
| 4,127,691 | 11/1978 | Frost . |
| 4,450,298 | 5/1984 | Kondrow et al. ........................ 568/437 |
| 4,508,851 | 4/1985 | Izumi et al. . |
| 4,758,272 | 7/1988 | Pierotti et al. . |
| 4,992,233 | 2/1991 | Swaroop et al. . |
| 5,427,601 | 6/1995 | Harada et al. . |
| 5,451,444 | 9/1995 | DeLiso et al. . |
| 5,487,917 | 1/1996 | Gadkaree . |
| 5,488,023 | 1/1996 | Gadkaree et al. . |
| 5,639,550 | 6/1997 | Lisenko . |
| 5,750,026 | 5/1998 | Gadkaree et al. . |
| 5,820,967 | 10/1998 | Gadkaree . |

*Primary Examiner*—W. L. Walker
*Assistant Examiner*—Terry K. Cecil
*Attorney, Agent, or Firm*—Anca C. Gheorghiu; L. Rita Herzfeld

[57] ABSTRACT

An activated carbon-crystalline titanium and/or tin silicate composite for purifying waste streams and method of making. The method involves providing a combination of a synthetic carbon precursor, and titanium and/or tin silicate, followed by curing, carbonizing, and activating the carbon precursor. The composite is used to purify fluid streams such as water, of pollutants such as VOC's, heavy metals such as lead, and chlorine.

25 Claims, No Drawings

ACTIVATED CARBON COMPOSITE WITH CRYSTALLINE TIN SILICATE

This application claims the benefit of U.S. Provisional Application No. 60/066,001, filed Nov. 14, 1997, entitled "Purification Composite and Device and Method of Making and Using Same", by Kishor P. Gadkaree.

This invention relates to a activated carbon-titanium and/or tin silicate composite and device for purification of fluid streams, especially for removal of chlorine, VOC's, and heavy metals from drinking water. The activated carbon is derived from a synthetic carbon precursor that is cured, carbonized, and activated.

BACKGROUND OF THE INVENTION

For drinking water purification, removal of chlorine, VOC's, and heavy metals such as lead, is considered essential. Typically packed beds of carbon are used for removal of chlorine and VOC's but activated carbon cannot remove heavy metals very efficiently. For the heavy metal removal, ion exchange resin beads are generally used in the packed beds with activated carbon. These resins are expensive and take up space. Thus the beds have to be made larger than is practical.

Use of inorganic materials that contain acidic groups such as amorphous titanium silicate or tin silicate to remove heavy metals is known. Titanium silicates or tin silicates within the composition range of mole ratio of silicon to titanium or tin from 1:4 to 1.9:1 are known to be especially useful for heavy metal removal. Such materials are available in the form of fine powders. These powders can be mechanically mixed with carbon and used in packed beds to obtain desired heavy metal removal. A packed bed can contain a mixture of carbon and ion exchange resin or carbon and titanium silicate, etc. When two different substances with different functions are used in packed beds, the size of the bed has to be made large enough so that sufficient contact efficiency with the fluid is obtained. The contact efficiency becomes a very important issue in the case of liquids such as water because of high diffusion resistance encountered in the liquid phase. In addition, the packed beds offer much higher resistance to flow, reducing the flow rate for a given pressure drop. Packed beds also offer poor particle filtration efficiencies and inconsistent performance due to channeling, etc. Another problem with this approach is that the fine titanium silicate powder gets washed out with the effluent which is not desirable. The fine powder increases resistance to flow causing low processing rates.

A compact system to remove heavy metals as well as VOC's and chlorine with high geometric surface area to obtain high flow rates and good particle removal efficiencies, is thus desired.

The present invention fills this need.

SUMMARY OF THE INVENTION

In accordance with one aspect of the invention, there is provided an activated carbon-crystalline titanium and/or tin silicate composite for purifying waste streams.

In accordance with another aspect of the invention, there is provided a method for making the above-described composite that involves providing a combination of a synthetic carbon precursor, and titanium and/or tin silicate, followed by curing, carbonizing, and activating the carbon precursor.

In accordance with another aspect of the invention, there is provided a method for purifying a fluid stream of at least one of the contaminants of VOC's, heavy metals such as lead, and chlorine that involves passing the stream through the above-described composite.

DETAILED DESCRIPTION OF THE INVENTION

The present invention provides a composite for removing heavy metals as well as VOC's and chlorine from fluid streams such as aqueous streams, e.g. water. The composite has high geometric surface area to obtain high flow rates and good particle removal efficiencies. The composite is made of activated carbon which is derived from a synthetic carbon precursor, and a purification enhancing agent which can be titanium silicate and/or tin silicate. The purification enhancing agent is mixed or contacted with the carbon precursor. This mixture is cured to cross link the precursor. The mixture is then carbonized and activated to obtain composite activated carbon. Forming the composite from an intimate mixture of a carbon precursor and the purification enhancing agent according to this invention results in a composite wherein continuous activated carbon is intimately bound with crystalline purification enhancing agent, such that the two cannot be separated by mechanical means such as sieving, or acid washing, etc. Therefore the composite powders of this invention have the advantage that the fine silicates are intimately bound to the activated carbon and cannot be washed out, as opposed to physical mixtures of activated carbon and the silicates. This composite activated carbon has high heavy metal, e.g. lead, removal capacity. The capacity to remove heavy metals can be further enhanced by treating this composite activated carbon with solutions of acids or salts of acids. The carbon precursor-purification enhancing agent composite can be supported on support material as will be described.

By carbon precursor is meant a carbon-containing synthetic substance that converts to continuous structure carbon on heating. The carbon precursor can include any synthetic liquid or liquefiable carbonaceous substance. Examples of useful carbon precursors include crosslinkable resins such as thermosetting resins, thermoplastic resins (e.g., polyvinylidene, polyvinyl chloride, polyvinyl alcohol, and the like), furfuryl alcohol.

Low viscosity carbon precursors (e.g., thermoset resins) are preferred for greater penetration of the carbon precursor into the porosity of the substrate. Phenolic resins are most preferred due to their low viscosity, high carbon yield, high degree of cross-linking upon curing relative to other precursors, and low cost. Phenolic resins that are especially suited are phenolic resoles such as plyophen (No. 43290), supplied by Occidental Chemical Co., Niagara Falls, N.Y.

The carbon precursor used in the present method can include a single precursor material or a mixture of two or more precursor materials.

In general, activated carbon bodies or coatings derived from carbon precursors have distinct advantages over bodies and coatings made from activated carbon. Bodies made directly from activated carbon are made of discontinuous carbon which must be bound together by permanent binders; whereas resin-derived activated carbon bodies are made of continuous carbon and do not require permanent binders. This continuous carbon structure is strong and durable and can be used in high flow rate chemical processes. Such bodies also have durability in liquid streams. Bodies made from activated carbon particles are not durable in organic solvents and in many cases even in water, since the binder holding the structure together is water soluble. Coatings made of activated carbon particles are not as uniform or adherent as those derived from carbon precursors, and are more subject to erosion.

In all embodiments, the amount of purification enhancing agent that is included with the carbon precursor is typically about 1–50 wt. %.

The carbon precursor-purification enhancing agent combination is preferably in contact with an inorganic material that supports it or gives it shape or strength. The composite and support can take the form of powders, granules, or shapes such as pellets, or monoliths such as multicellular structures e.g. honeycombs. By monolith is meant a structure that functions in an application as a unitary or single body as opposed to multiple pieces that function in beds, such as granules, pellets, and powders.

In one embodiment, the carbon precursor-purification enhancing agent combination is coated onto a support or substrate to form a purification device. Basic techniques for coating carbon precursors onto monolithic inorganic substrates are described in U.S Pat. No. 5,451,444 which is herein incorporated by reference.

An activated carbon coating derived from a carbon precursor extends over the outer surface of a porous substrate in the form of a substantially uninterrupted layer of carbon. This continuous carbon coating is anchored into the porosity and, as a result, is highly adherent. If interconnecting porosity is present in the substrate, an interlocking network of carbon will be formed within the substrate, resulting in an even more adherent carbon coating. The uninterrupted carbon provides advantages of high activity despite a relatively low carbon content, high strength, and high use temperatures. This is in contrast to discontinuous coatings, derived from for example, a slurry of binder and activated carbon particles. In slurry-coated structures, activated carbon is bound to the binder which in turn is bound to the substrate. As a result, binder particles are necessarily interdispersed through the carbon coating, rendering it discontinuous.

It is desirable that the overall open porosity of the substrate be at least about 10%, preferably greater than about 25% and most preferably greater than about 40%. For most purposes, the desirable range of porosity is about 45% to about 55%. Preferably the pores of the substrate material create "interconnecting porosity" which is characterized by pores which connect into and/or intersect other pores to create a tortuous network of porosity within the substrate.

The substrate must have enough strength to function in the application and be capable of withstanding the heat-treating temperature experienced in forming the activated carbon coating.

In its most useful form, the substrate is a monolithic substrate. Typical monolithic substrates have means for passage of a fluid stream therethrough, e.g., a network of pores communicating from the outside to the inside, and/or through channels extending from one end of the monolith to the other for passage of the fluid stream into one end and out through the other end.

Suitable porous substrate materials include ceramic, glass ceramic, glass, metal, graphitic carbon, activated carbon, and combinations thereof. By combinations is meant physical or chemical combinations, eg., mixtures, compounds, or composites.

Some materials that are especially suited to the practice of the present invention, although it is to be understood that the invention is not limited to such, are those made of cordierite, mullite, clay, magnesia, and metal oxides, talc, zircon, zirconia, zirconates, zirconia-spinel, magnesium alumino-silicates, spinel, alumina, silica, silicates, borides, alumino-silicates, eg., porcelains, lithium aluminosilicates, alumina silica, feldspar, titania, fused silica, nitrides, borides, carbides, eg., silicon carbide, silicon nitride or mixtures of these. Cordierite is preferred because its coefficient of thermal expansion is comparable to that of carbon, increasing the stability of the activated carbon body. Some typical ceramic substrates are disclosed in U.S. Pat. Nos. 4,127,691 and 3,885,977. Those patents are herein incorporated by reference as filed.

Suitable metallic materials are any metal or alloy or intermetallic compound that provides durable structural service, and does not soften below about 600° C. Particularly useful are alloys which are predominantly of iron group metal (i.e. Fe, Ni, and Co), either with carbon (e.g. steels, especially stainless or high temperature steels) or without carbon. Most typical of the latter alloys for higher temperature service are those consisting essentially of iron group metal and aluminum, with the preferred iron group metal being iron. Especially preferred is Fe, Al, and Cr. For example, Fe5—20Al5—40Cr, and Fe7—10Al10—20Cr powders with other possible additions are especially suited. Some typical compositions of metal powders for forming substrates are disclosed in U.S. Pat. Nos. 4,992,233, 4,758,272, and 5,427,601 which are herein incorporated by reference as filed. U.S. Pat. Nos. 4,992,233 and 4,758,272 relate to methods of producing porous sintered bodies made from metal powder compositions of Fe and Al with optional additions of Sn, Cu, and Cr. U.S. Pat. No. 5,427,601 relates to porous sintered bodies having a composition consisting essentially of in percent by weight about 5 to 40 Cr, about 2 to 30 Al, 0 to about 5 of special metal, 0 to about 4 of rare earth oxide additive and the balance being iron group metal and unavoidable impurities, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanide, Zr, Hf, Ti, Si, and B, with optional additions of alkaline earths, Cu, and Sn.

Especially preferred materials are cordierite, mullite, zeolite, alumina, graphitic carbon, activated carbon, clays, e.g. talc, and combinations thereof.

The substrate is preferably a honeycomb or matrix of thin walls forming a multiplicity of open ended cells extending between the ends of the honeycomb. The honeycomb geometry has significantly higher surface area for the same volume of packed bed and because filtration takes place through a thin wall, the flow rates are higher for a given pressure drop. Alternately, the cells of a multicellular structure can be plugged at one end and alternately plugged with respect to the adjacent cells as in filter technology.

Generally honeycomb cell densities range from 235 cells/$cm^2$ (about 1500 cells/$in^2$) to 1 cell/$cm^2$ (about 6 cells/$in^2$ (web) thicknesses range typically from about 0.1 to about 1.5 mm. The external size and shape of the body is controlled by the application.

In another embodiment the carbon precursor-purification enhancing agent combination is shaped into a monolith to form a purification device. The shapes, including cell plugging, can be the same as for the substrates described previously. This can be done by known methods of shaping mixtures of carbon precursor, binders and/or fillers that are at least inorganic, and forming aids, such as by extrusion, molding, etc. The inorganic fillers can be considered to be the supports or substrates for the activated carbon.

Optionally, there can be organic fillers, but these would not be considered to be supports or substrates according to this invention.

Some fillers that are suited include both natural and synthetic, hydrophobic, and hydrophilic, fibrous and nonfibrous, carbonizable and non-carbonizable fillers.

Some inorganic fillers that can be used are oxygen-containing minerals such as clays, zeolites, talc, etc., carbonates, such as calcium carbonate, aluminosilicates such as kaolin (an aluminosilicate clay), flyash (an aluminosilicate ash obtained after coal firing in power plants), silicates, e.g. wollastonite (calcium metasilicate), titanates, zirconates, zirconia, zirconia spinel, magnesium aluminum silicates, mullite, alumina, e.g., gamma alumina, alumina trihydrate, spinel, feldspar, attapulgites, and aluminosilicate fibers, cordierite powder, etc.

Some examples of especially suited inorganic fillers are cordierite powder, talcs, clays, and aluminosilicate fibers such as provided by Carborundum Co. Niagara Falls, N.Y. under the name of Fiberfax, and combinations of these. Fiberfax aluminosilicate fibers measure about 2–6 micrometers in diameter and about 20–50 micrometers in length.

For example some natural fillers are soft woods, e.g. pine, spruce, redwood, etc., hardwoods e.g. ash, beech, birch, maple, oak, etc., sawdust, shell fibers e.g. ground almond shell, coconut shell, apricot pit shell, peanut shell, pecan shell, walnut shell, etc., cotton fibers erg. cotton flock, cotton fabric, cellulose fibers, cotton seed fiber, chopped vegetable fibers for example, hemp, coconut fiber, jute, sisal, and other materials such as corn cobs, citrus pulp (dried), soybean meal, peat moss, wheat flour, wool fibers, corn, potato, rice, tapioca, coal powder, activated carbon powder, graphitic powder, etc. Some synthetic materials are regenerated cellulose, rayon fabric, cellophane, etc.

Some examples of carbonizable fillers that are especially suited for liquid resins are cellulose, cotton, wood, and sisal, or combinations of these, all of which are preferably in the form of fibers.

Hydrophobic organic fillers provide additional support to the shaped structure and introduce wall porosity on carbonization because in general they leave very little carbon residue. Some hydrophobic organic fillers are polyacrylonitrile fibers, polyester fibers (flock), nylon fibers, polypropylene fibers (flock) or powder, acrylic fibers or powder, aramid fibers, polyvinyl alcohol, etc.

Some binders that can be used are plasticizing temporary organic binders such as cellulose ethers. Some typical cellulose ethers are methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred.

Some binders and fillers that are especially suited are described in U.S. patent application Ser. No. 08/650,685, filed May 20, 1996. That application is herein incorporated by reference.

Some forming e.g. extrusion aids are soaps, fatty acids such as oleic, linoleic acid, etc., polyoxyethylene stearate, etc. or combinations of these. Especially preferred is sodium stearate. Optimized amounts of extrusion aid(s) depend on the composition and binder.

Other additives that are useful for improving the extrusion and curing characteristics of the batch are phosphoric acid and oil. Phosphoric acid improves the cure rate and increases adsorption capacity. It is typically about 0.1% to 5 wt. % in the mixture. The oil addition aids in extrusion and results in increase in surface area and porosity. Oil is added typically at about 0.1 to 5 wt. % in the mixture.

The oil must be water immiscible, so that with liquid resins it can form a stable emulsion. With solid resin, a suspension is formed. Some useful oils are petroleum oils with molecular weights from about 250 to 1000, containing paraffinic and/or aromatic and/or alicyclic compounds. So called paraffinic oils composed primarily of paraffinic and alicyclic structures are preferred. These can contain additives such as rust inhibitors or oxidation inhibitors such as are commonly present in commercially available oils. Some useful oil are 3 in 1 oil from 3M Co., or 3 in 1 household oil from Reckitt and Coleman In., Wayne, N.J. Other useful oils are synthetic oils based on poly alpha olefins, esters, polyalkylene glycols, polybutenes, silicones, polyphenyl ether, CTFE oils, and other commercially available oils. Vegetable oils such as sunflower oil, sesame oil, peanut oil, etc. are also useful. Especially suited are oils having a viscosity of about 10 to 300 cps, and preferably about 10 to 150 cps.

Generally the amount of activated carbon in the shaped body is about 10 to 98 wt %.

The carbon precursor-purification enhancing agent combination is dried typically about 80–90° C. and the precursor cured at 120–180° C. It is then carbonized in inert atmosphere at about 600–1100° C. It is then activated to form porosity. The activation step also ensures that the purification-enhancing agent is in the crystalline form for maximum purification activity. Activation is done by known methods such as exposing the structure to an oxidizing agent such as steam, carbon dioxide, metal chloride (e.g., zinc chloride), phosphoric acid, at high temperatures (e.g., about 600° C. to about 1000° C.).

The resulting activated carbon-purification enhancing agent composite is then treated with solutions of acids or acid salts such as e.g. mineral acids such as nitric or sulfuric, or organic acids or salts such as chlorides, nitrates, sulfates, acetates, etc. to enhance performance.

In the final activated carbon-purification enhancing agent composite, the purification enhancing agent can make up about 2% to 70% by weight.

The cells of the multicellular structures e.g. honeycombs can be alternately plugged as in filter technology. The flow of water is through the cell walls providing intimate contact with both the activated carbon and purification enhancing agent for removal of impurities.

The purification composites or devices of this invention therefore contain activated carbon as well as titanium and/or tin silicate to remove chlorine, VOC's and heavy metals.

To more fully illustrate the invention, the following non-limiting examples are presented. All parts, portions, and percentages are on a weight basis unless otherwise stated.

EXAMPLE 1 (comparative)

Phenolic resole resin from Georgia Pacific Co. with a viscosity of about 150–200 cps was mixed with cordierite powder and then poured into a tray and then heated at about 90° C. for about 2 hours to dry the resin, and then heated in stages: first to about 125° C. and then to about 150° C. for about 1 hour to fully cure the resin. The cured resin was ground to a powder with a mean particle diameter of about 100 micrometers. The powder was then heated in nitrogen to about 900° C. for about 6 hours to carbonize the powder which was then activated in carbon dioxide at about 900° C. for about 2 hours to form activated carbon.

To test the lead removal capacity of this powder, a solution of lead chloride was first made by dissolving lead chloride in water to give about 144 ppb. To about 500 g of this solution, about 1 g of activated carbon powder was added and the solution was stirred for about 2 hours at room temperature. After this time period, the carbon powder was filtered out and the water was tested for lead concentration. The lead concentration had dropped to about 31 ppb, which was about 78% removal.

EXAMPLE 2 (inventive)

The procedure of Example 1 was followed except that about 10% titanium silicate of mean particle diameter of about 21.3 micrometers, was added to the resin before cure and mixed thoroughly. The resin was then cured, carbonized, and activated as in Example 1. About 1 g of this composite powder was used to remove lead from water. The lead concentration dropped from about 144 ppb to about 20 ppb or about 86% removal in this case, which was substantially higher than that of Example 1.

EXAMPLE 3 (inventive)

The composite carbon powder of Example 2 containing titanium silicate and carbon was dispersed in 3% acetic acid (3% glacial acetic acid and 97% distilled water) and mixed for about 1 hr. This powder was then dispersed in about 6% acetic acid and the process was repeated. The powder was filtered and washed in distilled water until the pH of the wash water dropped to about 7, indicating that no acid was present on the powder. The powder was then tested for lead removal capacity as before. The lead concentration dropped from about 144 ppb to about 3.6 ppb. The acid washing procedure thus resulted in about 97.5% lead removal, which was substantially higher than untreated powder.

EXAMPLE 4 (inventive)

The powder of Example 2 was treated with sodium chloride solution at about 3% and 6% levels as in Example 3. The resulting powders were washed with water as before and then tested for lead removal capacity. The lead concentration dropped from about 144 ppb to about 2.5 ppb, again showing that the post-treatment improves lead removal efficiency considerably.

EXAMPLE 5 (inventive)

The powder of Example 2 was treated with hydrochloric acid and then water washed to remove all the acid from the powder. This treated powder reduced the lead concentration from about 144 ppb to about 3.8 ppb.

EXAMPLE 6 (comparative)

About 1 g of amorphous titanium silicate fine powder was mixed with about 500 g of 144 ppb lead solution as before. The lead concentration dropped from about 144 ppb to about 12 ppb.

These examples show that a composite carbon, i.e. supported carbon with titanium and/or tin silicate, with significantly higher lead removal capacity than either the activated carbon powder alone or the titanium silicate alone can be obtained by the process of the present invention.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of producing an activated carbon composite composed of an activated carbon adsorber intimately bound with a crystalline tin silicate, the crystalline tin silicate acting as a purification enhancing agent, the method comprising the steps of:
   a) providing a combination consisting of a synthetic carbon precursor and tin silicate, wherein the tin silicate is a purification enhancing agent;
   b) curing the carbon precursor;
   c) carbonizing the cured carbon precursor to form carbon; and
   d) activating the carbon to form porosity and render the tin silicate in a crystalline form, wherein the activated carbon is a continuous structure and intimately bound with the crystalline tin silicate.

2. A method of claim 1 wherein the activated carbon composite is exposed to an acidic solution following step d) to enhance performance of the activated carbon composite.

3. A method of claim 1 wherein the carbon precursor is crosslinkable resin.

4. A method of claim 3 wherein the carbon precursor is a synthetic resin selected from the group consisting of phenolic resins, polyfurfuryl resins, and combinations thereof.

5. A method of claim 4 wherein the carbon precursor is phenolic resin.

6. A method of claim 1 wherein said tin silicate is about 1 to 50% by weight.

7. A method of claim 1 wherein prior to the curing step, the combination is contacted with a support selected from the group consisting of ceramic, glass, glass ceramic, molecular sieve, graphitic carbon, activated carbon, and combinations thereof.

8. A method of claim 7 wherein the support is selected from the group consisting of cordierite, mullite, alumina, zeolite, clay, and combinations thereof.

9. A method of claim 7 wherein the combination is contacted with a monolithic support to form a coating on the support to form a device.

10. A method of claim 9 wherein the support is a multicellular structure.

11. A method of claim 10 wherein the cells of the monolithic multicellular structure are alternately plugged at both ends.

12. A method of claim 7 wherein prior to the curing step, the combination and support are shaped into a monolithic structure to form a device.

13. A method of claim 12 wherein the support is a multicellular structure.

14. A method of claim 13 wherein the cells of the monolithic multicellular structure are alternately plugged at both ends.

15. An activated carbon composite consisting of a continuous activated carbon adsorber intimately bound with a crystalline tin silicate wherein the crystalline tin silicate acts as a purification enhancing agent, the activated carbon composite being made by the method of claim 1.

16. An activated carbon composite of claim 15 wherein the crystalline tin silicate makes up about 2% to 70% by weight of the total weight of the activated carbon composite.

17. A method of purifying a fluid stream of at least one of the contaminants of volatile organic, heavy metal, and chlorine, the method comprising passing the aqueous stream through the composite of claim 15 to cause removal of at least one of the contaminants of volatile organic, heavy metal, and chlorine by said composite.

18. An activated carbon composite of claim 15 wherein the continuous activated carbon intimately bound to the crystalline tin silicate are in contact with an additional component that serves as a support.

19. An activated carbon composite of claim 18 wherein the support is selected from the group consisting of ceramic, glass, glass ceramic, molecular sieve, graphitic carbon, activated carbon, and combinations thereof.

20. An activated carbon composite of claim 19 wherein the support is selected from the group consisting of cordierite, mullite, alumina, zeolite, clay, and combinations thereof.

21. An activated carbon composite of claim 18 wherein the composite is present as a coating on an inorganic monolithic support.

22. An activated carbon composite of claim 21 wherein the support is in the form of a multicellular structure having an inlet end and an outlet end wherein the cells extend from one end to the other.

23. A method of purifying a fluid stream of at least one of the contaminants of volatile organic, heavy metal, and chlorine, the method comprising passing the aqueous stream into the inlet end, through the cells, and out through the outlet end of the structure of claim 22 to cause removal of at least one of the contaminants of volatile organic, heavy metal, and chlorine by said composite.

24. An activated carbon composite of claim 22 wherein the cells of the monolithic multicellular structure are alternately plugged at both ends.

25. A method of purifying a fluid stream of at least one of the contaminants of volatile organic, heavy metal, and chlorine, the method comprising passing the aqueous stream into the open cells at the inlet end, and out through the open cells at the outlet end of the structure of claim 24 to cause removal of at least one of the contaminants of volatile organic, heavy metal, and chlorine by said composite.

* * * * *